US008477176B1

United States Patent
Cortes et al.

(10) Patent No.: US 8,477,176 B1
(45) Date of Patent: Jul. 2, 2013

(54) SYSTEM AND METHOD FOR AUTOMATICALLY SUGGESTING OR INVITING A PARTY TO JOIN A MULTIMEDIA COMMUNICATIONS SESSION

(75) Inventors: Marcelo Enrique Stockl Cortes, Kitchener (CA); Ryan James Fioravanti, Kitchner (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/553,139

(22) Filed: Jul. 19, 2012

(51) Int. Cl.
*H04N 7/15* (2006.01)

(52) U.S. Cl.
USPC ............... 348/14.08; 348/14.09; 348/14.12

(58) Field of Classification Search
USPC ................ 348/14.01–14.16; 709/204–206
See application file for complete search history.

(56) References Cited

U.S. PATENT DOCUMENTS

| 7,987,233 | B1 * | 7/2011 | Osborne et al. ............... 709/206 |
| 2007/0050448 | A1 * | 3/2007 | Gonen et al. .................. 709/204 |
| 2008/0075255 | A1 * | 3/2008 | Nguyen et al. ........... 379/202.01 |
| 2009/0089683 | A1 | 4/2009 | Thapa |
| 2010/0121666 | A1 * | 5/2010 | Niazi ................................ 705/8 |
| 2011/0302247 | A1 | 12/2011 | Narayanan et al. |

* cited by examiner

*Primary Examiner* — Melur Ramakrishnaiah
(74) *Attorney, Agent, or Firm* — Leydig, Voit & Mayer, Ltd.

(57) ABSTRACT

The present disclosure includes a system and method for automatically suggesting or inviting a party to join a multimedia communications session. In some embodiments, a first party, which is not currently participating in an existing multimedia communications session, attempts to contact a second party, which is currently participating in the multimedia communications session. In these embodiments, the first party automatically receives a suggestion or invitation to join the multimedia communications session when the first party has permission to join. In some instances, the multimedia communications session is a video conference including audio and video communications.

19 Claims, 9 Drawing Sheets

SYSTEM AND METHOD FOR AUTOMATICALLY SUGGESTING OR INVITING A PARTY TO JOIN A MULTIMEDIA COMMUNICATIONS SESSION

BACKGROUND

Advances in technology have improved upon and expanded the variety of mechanisms individuals use to communicate. Today, these mechanisms provide the ability to communicate textually, auditorily, visually, or by any combination thereof, i.e., multimedia communications. With these advances, it is commonplace for an individual to simultaneously use or have access to many different mechanisms for communication. As a result, it is not uncommon for an individual to attempt to contact another individual using a first mechanism for communication, while the other individual is involved in an existing communications session using a second mechanism.

For example, a first individual may attempt to contact a second individual via a text messaging service while the second individual is involved in a video conference with a third individual. In this scenario, the second individual may not notice or respond to the first individual's text message in a timely manner or may plan to respond but ultimately forget. If the first individual's text message contained important or time sensitive information, the second individual may miss the opportunity to respond or be disadvantaged. Alternatively, the second individual may notice the text message and interrupt the video conference with the third individual. In the case where the text message does not contain important or time sensitive information, this interruption may be a nuisance.

Consequently, there is a need for a system and method to notify an individual that the party the individual is attempting to contact is participating in an existing communications session and automatically suggesting or inviting the individual to join the existing communications session without interrupting the communications session.

SUMMARY

The present disclosure includes a system comprising a plurality of participating client devices participating in a multimedia video communications session, a non-participating client device configured to participate in multimedia video communications, an intent judging unit configured to determine when a user of the non-participating client device expresses intent to communicate by inputting contact information into the non-participating client device, a contact judging unit configured to determine whether the contact information is associated with one of a plurality of user profiles, a status judging unit configured to determine whether a user profile is associated with the multimedia video communications session, a permission judging unit configured to determine whether the user of the non-participating client device has permission to participate in the multimedia video communications session, and a suggestion transmission unit configured to transmit a suggestion to the non-participating client device for the non-participating client device to join the multimedia video communications session.

In some instances, the system further comprises a server configured to store the plurality of user profiles, each user profile comprising at least one identifier associated with the user profile. The intent judging unit, the contact judging unit, the status judging unit, the permission judging unit, and the suggestion transmission unit maybe located at the server. Alternatively, the intent judging unit, the contact judging unit, the status judging unit, the permission judging unit, and the suggestion transmission unit are located at the non-participating client device.

Additionally, the non-participating client may include an input unit configured to receive input, and a display device, wherein a prompt is displayed on the display device when the suggestion transmission unit transmits a suggestion to the non-participating client device for the non-participating client device to join the multimedia video communications session.

Some embodiments describe a method at a client for providing a suggestion to join an existing multimedia video communications session comprising detecting input of contact information into the client, determining whether the contact information is associated with a contact stored on a contact list that is accessible by the client, determining whether the contact is associated with a multimedia video communications session, determining whether the client is authorized to participate in the multimedia video communications session when the contact is associated with the multimedia video communications session, and providing a suggestion to the client for the client to join the multimedia video communications session when the client is authorized to participate.

The method at the client may comprise receiving periodic notifications indicating presence state information of contacts associated with the contact list accessible by the client, wherein the contact list is stored locally on the client.

Other embodiments describe a method at a server for providing a suggestion to join an existing multimedia video communications session comprising receiving contact information, determining whether the contact information is associated with a contact stored on a contact list that is accessible by the server, determining whether the contact is associated with a multimedia video communications session, determining whether a client is authorized to participate in the multimedia video communications session when the contact is associated with the multimedia video communications session, and transmitting a suggestion to the client for the client to join the multimedia video communications session when the client is authorized to participate.

The method at the server may further comprise determining whether a predetermined amount of time has elapsed from receiving the contact information, and transmitting the suggestion to join the multimedia video communications session when the predetermined amount of time has not elapsed.

DETAILED DESCRIPTION OF EXAMPLE EMBODIMENTS

In an example embodiment, a service provider supports multimedia communication among individuals and facilitates the communication once credentials are established enabling the service provider to determine when such facilitation is appropriate. The ability to access and use a service at a service provider is not available until an individual registers with the service provider. This process is generally initiated when an individual creates a user account or profile ("profile or user profile"). In most instances, the profile is maintained by the service provider. The user profile may contain personal information about the user. Additionally, the user or the service provider may generate contact information that is either included in the profile or associated with the profile. Examples of contact information include, but are not limited to, a telephone number, an email address, and a username. The service provider controls access to the contact information by other individuals to facilitate contact with the individual associated with the user profile.

In this embodiment, the service provider supports more than one mechanism for communication, allowing individuals to initiate a communications session using one mechanism and transition to another to complete the communications session. This may be accomplished by providing a different application for each form of communication and/or by combining more than one form of communication into a single application. One example of a suitable multimedia communications environment is the Google+ environment. The Google+ environment supports, at least, a mobile text messaging service, an instant messaging service, an email service, mobile telephony, and a video conferencing service ("Google+ hangouts").

An example multimedia communications environment is described in detail with respect to FIGS. 1-5. The illustrated environment is presented as an example, and does not imply any limitation regarding the use of other group networking environments. To the contrary, the description contemplates all implementations of multimedia communications environments that support notifying an individual that the party the individual is attempting to contact is participating in an existing communications session and automatically suggesting or inviting the individual to join the existing communications session without interrupting the communications session.

Figure 1:
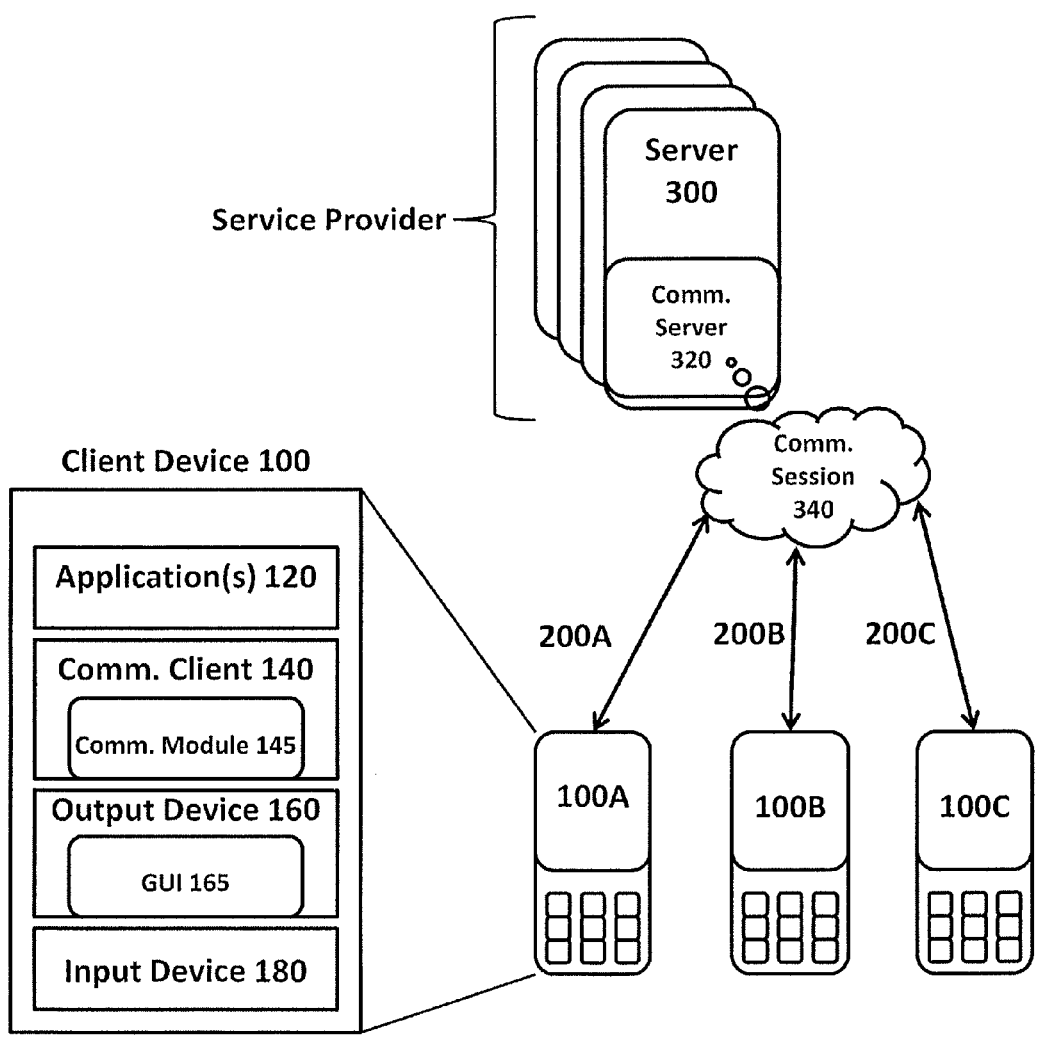
FIG. 1 is a block diagram of an example system supporting a multimedia communication environment, including a plurality of client devices interacting through a common communications session hosted by a service provider.

Turning to FIG. 1, example client devices 100A-C, presented in further detail by client device 100, are connected to a service provider supporting a multimedia communications environment that enables one or more communications sessions among the client devices 100A-C. Example client devices 100A-C include, but are not limited to, portable, mobile, and/or stationary devices such as landline telephones, mobile telephones (including "smart phones"), laptop computers, tablet computers, desktop computers, personal digital assistants (PDAs), portable gaming devices, portable media players, and e-book readers. In some embodiments, two or more client devices 100A-C may be connected in the same manner to a communications session. Similarly, client devices 100A-C may include similar communications mechanisms. For example, client device 100A and client device 100B may both be mobile telephones. In other embodiments, two or more client devices 100A-C are different types of devices. For example, client device 100A may be a mobile telephone and client device 100B may be a desktop computer or other client residing on and powered by programmed logic circuits.

In the embodiment illustrated by FIG. 1, the client device 100A communicates with server 300 via a communications channel 200A. The communications channel typically includes an Internet or mobile communication connection between the client 100A and the server 300 but could be established by other such communications circuits such closed networks, etc. The server 300 often comprises multiple physical servers such as a communications server 320 for maintaining or "hosting" one or more communications sessions. Of course, each server can be a physically separate machine or it can be different processes running within the same physical machine. In this embodiment, the server 300 is maintained by a service provider in order to facilitate communication and interaction among individuals, e.g., users of the client devices 100A-C.

In one example embodiment, the client device 100A maintains or hosts a communications session and other client devices such as the client devices 100B-C in FIG. 1 are routed to the communications session at the client device 100A by server 300 or the like. Additionally, in some embodiments the server 300 includes a plurality of interconnected devices maintained at different physical locations.

Communications sessions at the communications server 320 are supported by an environment defined by a runtime engine executing at the server 300. For example, the runtime engine may be Google's "App Engine." The runtime engine provides the platform for the communications session and supplies resources required for user interaction. The resources of the application engine are available to the communications session by way of an application programming interface (API) or other connecting application, transferring protocol or the like. In some instances, multimedia streams are distributed by reflectors distributing combined signals in various protocols such as real time protocol (RTP).

The client device 100 of FIG. 1 includes application(s) 120, communications client 140, output device 160 (e.g., a display), and input device 180 (e.g., keyboard, mouse, touch screen). Application(s) 120 provide the client device 100 with a variety of functionality. Generally, application(s) 120 employ the output device 160 to display information at a graphical user interface (GUI) 165 and the input device 180 to accept and respond to user input. The application(s) 120 may include, but are not limited to, an email client, an instant messaging client, a text messaging client, a video conferencing client (e.g., Google+ Hangouts), an Internet browser, and/or the like.

The communications client 140 further includes a communications module 145 that enables output device 160 to display information at the GUI 165. The communications module 145 also enables the communications client 140 to connect to the communications server 320, allowing a user of the client device 100 in FIG. 1 to establish or join a communications session. Typically, the communications module 145 is a network module that connects the client device 100 to a network such as the Internet using network protocol techniques including, by way of example, transmission control protocols and internet protocols. In this manner multiple client devices 100A-C may join the same communications session 340 hosted at the communications server 320. Through the communications session 340, the communications module 145 at the client device 100 enables the user to reside in a location where other client devices may join the session.

Once a communications session 340 is established, a session channel, e.g., channels 200A-C, between the communications client 140 and the communications server 320 exchanges data, such as audio, video, text, and/or other information. In some embodiments, the data exchanged between the communications client 140 and the communications server 320 is optimized based, at least in part, on the hardware and/or software capabilities of client device 100. For example, if the client device 100 is a mobile device connecting to the communications session 340 by way of a bandwidth limited path such as a cellular network, communications server 320 may optimize the number and quality of the audio, video, text, and/or other information sent to the client device 100. Furthermore, the communications client 140 may dynamically adjust the bit rate required to send the information to the communications server 320 by, for example, reducing the quality of the audio, video, text, and/or other information being sent to the communications server 320.

GUI 165 is an illustrative example of a GUI from which a communications session may be initiated and sustained. In the illustrated embodiment, GUI 165 includes information about one or more other client devices connected to the client device 100 by the communications session 340. The GUI may also include notifications of events and other information relevant to the user of the client device 100.

In order to establish or join a communications session, a user of client device 100 interacts with the input device 180 and/or the GUI 165 to cause the communications client 140 to generate a request to create a new communications session 340 or join an existing communications session. For example, GUI 165 may include a "Send Message" button that the user activates in order to create a new communications session. In response to the user activating the Send Message button, communications client 140 sends a request to initiate a new communications session 340 to communications server 320, which establishes a new communications session.

In an alternative embodiment, a user of client the device 100 requests to join an existing communications session 340 or the service provider may determine that the user should be joined to an existing session. In this example embodiment, the service provider includes business rules and other information such as other open sessions. Based upon information provided by the user which may be explicit (e.g., by responding to a prompt), or implicit (e.g., by selecting a certain entry point), the service provider may communicate with the communications server 320 to join the user to a communications session 340 already ongoing.

In another alternative, the user of client device 100 selects a "join existing session" icon at the GUI 165 and selects a session from a displayed list of available communications sessions at the GUI or selects an icon displayed in an external source such as an instant message or posting. However communicated to the user, in response to the user initiating an attempt to join an existing communications session, communications client 140 sends a request to join the communications session 340 to the communications server 320. The request includes an identifier of the particular communications session 340 associated with the service provider. In some embodiments the identifier is a Jabber ID (JID), universal resource identifier (URI), or uniform resource locator (URL). The identifier may be included in the join link. The communications server 320 connects the communications client 140 to the specified the communications session 340.

Figure 2:
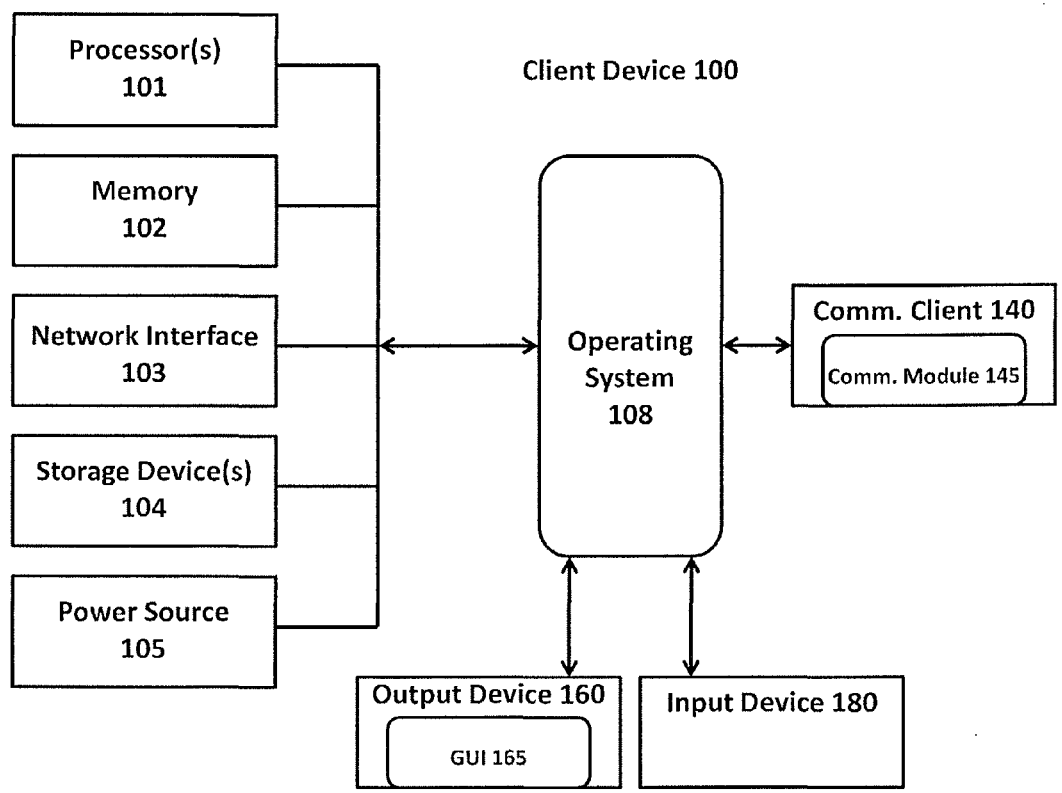
FIG. 2 is a block diagram of basic functional components for one of the client devices in FIG. 1.

Referring now to FIG. 2, one example of the client device 100 is illustrated. In general, many other embodiments of the client device 100 may be used as long as they support at least limited participation in the communications sessions, including multimedia communications sessions such as video conferencing. In the example embodiment of FIG. 2, the client device 100 includes one or more processors 101, memory 102, network interface 103, one or more storage devices 104, power source 105, output device 160, and input device 180. The client device 100 also includes an operating system 108 and a communications client 140 that are executable by the client device 100. In a conventional fashion, each of components 101, 102, 103, 104, 105, 160, 180, 108, and 140 are interconnected physically, communicatively, and/or operatively for inter-component communications.

As illustrated, the processor(s) 101 are configured to implement functionality and/or process instructions for execution within the client device 100. For example, the processor(s) 101 execute instructions stored in the memory 102 or instructions stored on the storage devices 104. The memory 102, which may be a non-transient, computer-readable storage medium, is configured to store information within client device 100 during operation. In some embodiments, the memory 102 includes a temporary memory, area for information not to be maintained when the client device 100 is turned off. Examples of such temporary memory include volatile memories such as random access memories (RAM), dynamic random access memories (DRAM), and static random access memories (SRAM). The memory 102 is maintains program instructions for execution by the processor(s) 101.

The storage device(s) 104 also include one or more non-transient computer-readable storage media. The storage device(s) 104 are generally configured to store larger amounts of information than the memory 102. The storage device(s) 104 may further be configured for long-term storage of information. In some examples, the storage device(s) 104 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client device 100 uses the network interface 103 to communicate with external devices via one or more networks, such as one or more wireless networks. The network interface 103 may be a network interface card, such as an Ethernet card, an optical transceiver, a radio frequency transceiver, or any other type of device that can send and receive information. Other non-limiting examples of network interfaces include Bluetooth®, 3G, 4G, and WiFi® radios in mobile computing devices, and universal serial bus (USB). In some embodiments, the client device 100 uses the network interface 103 to wirelessly communicate with an external device such as the server 300 of FIG. 1, a mobile phone, or other networked computing device.

The client device 100 includes one or more input devices 180. The input device 180 is configured to receive input from a user through tactile, audio, and/or video feedback. Non-limiting examples of the input device 180 include a presence-sensitive screen, a mouse, a keyboard, a voice responsive system, video camera, microphone or any other type of device for detecting a command from a user. In some examples, a presence-sensitive screen includes a touch-sensitive screen.

One or more output devices 160 are also included in client device 100. The output device 160 is configured to provide output to a user using tactile, audio, and/or video stimuli. The output device 160 may include a display screen (part of the presence-sensitive screen), a sound card, a video graphics adapter card, or any other type of device for converting a signal into an appropriate form understandable to humans or machines. Additional examples of the output device 160 include a speaker, a cathode ray tube (CRT) monitor, a liquid crystal display (LCD), or any other type of device that can generate intelligible output to a user.

The client device 100 includes one or more power sources 105 to provide power to the client. Examples of the power source 105 include single-use power sources, rechargeable power sources, and/or power sources developed from nickel-cadmium, lithium-ion, or other suitable material.

The client device 100 includes an operating system 108 such as the Android® operating system. The operating system 108 controls operations of the components of the client device 100. For example, the operating system 108 facilitates the interaction of the communications client 140 with the processor(s) 101, memory 102, network interface 103, storage device(s) 104, input device 180, output device 160, and the power source 105. As illustrated in FIG. 2, the communications client 140 includes the communications module 145. Each of the communications client 140 and the communications module 145 typically includes program instructions and/or data that are executable by the client device 100. For example, in one example embodiment communications module 145 includes instructions causing the communications client 140 executing on the client device 100 to perform one or more of the operations and actions described in the present disclosure.

In some example embodiments, the communications client 140 and/or communications module 145 form a part of operating system 108 executing on the client device 100. In other embodiments, the communications client 140 receives input from one or more of the input devices 180 of the client device 100. The communications client 140 preferably receives audio and video information associated with a communications session 340 from other client devices participating in the communications session. In some instances the communications client 140 and/or communications module 145 may include an email client, an instant messaging client, a text messaging client, a video conferencing client (e.g., Google+ Hangouts), an Internet browser, and/or the like.

Figure 3:
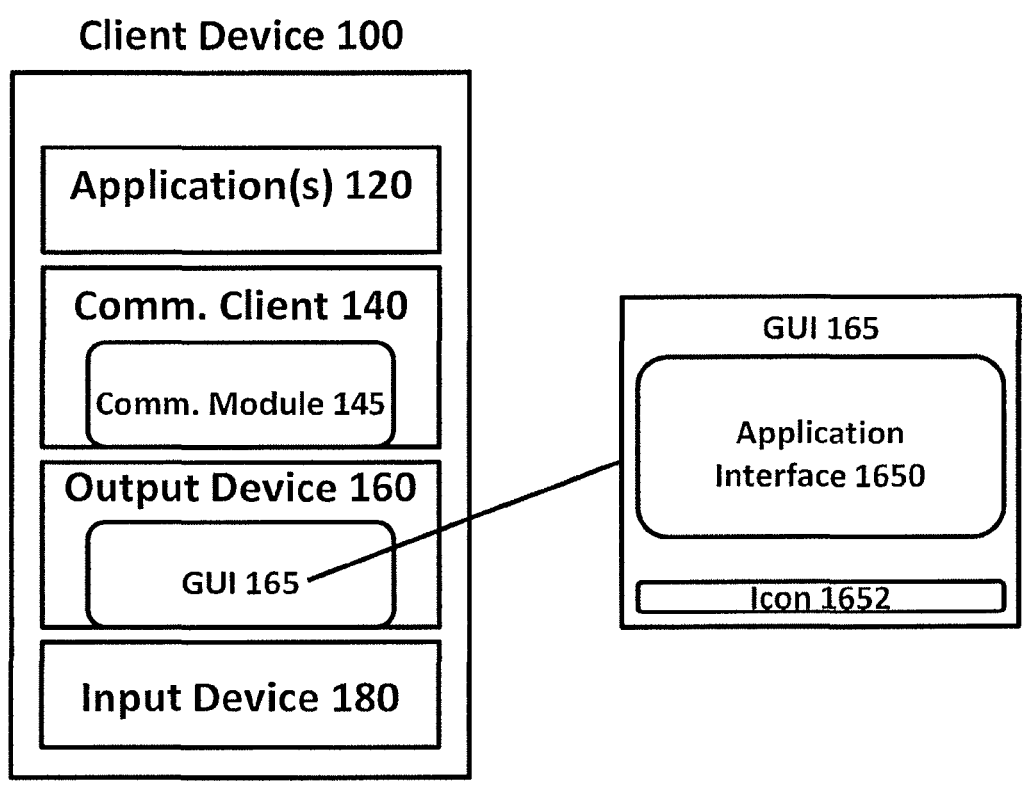
FIG. 3 is an application level block diagram of the client device in FIG. 2, illustrating example executable components supporting at the client a group interaction experience within the multimedia communication environment.

FIG. 3 illustrates an example configuration of the client device 100 when it seeks to generate a communications session. The communications client 140 initiates a communications session from the client device 100 and maintains the session with the communications session 340 at the communications server 320. As shown in FIG. 3, GUI 165 displays application interface 1650. Application interface 1650 may also allow the user to use and interact with the application(s) 120, which in one embodiment can be an Internet browser such as Google Chrome. In some examples, application interface 1650 is a graphical display that is not interactive.

The communications module 145 causes GUI 165 to display a user-selectable icon 1652. Non-limiting examples of the icon 1652 are a virtual or graphical button, such as a key of a virtual keyboard, a touch-target, a physical button of client device 100, or a button on an input device 180 coupled to client device 100, such as a mouse button, a button on a mobile device, or a key of a keyboard. Of course, the GUI 165 may include other graphical controls as well.

Figure 4:
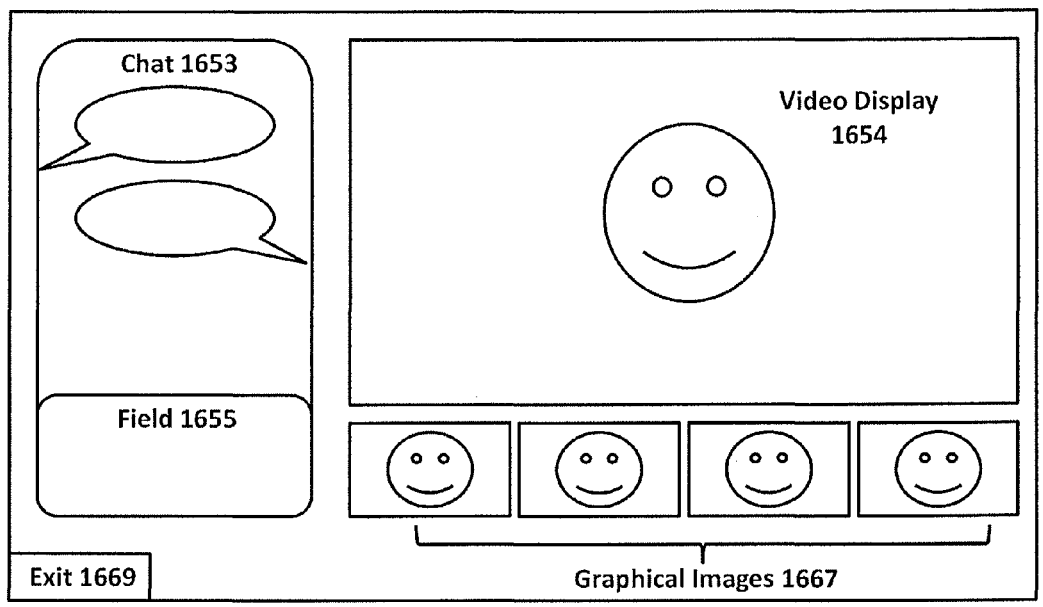
FIG. 4 is an example graphical user interface at the client device of FIGS. 2 and 3 available to a user for the group interaction experience.

The graphical user interface (GUI) of FIG. 4 is an example of the GUI 165 of the client device 100 such as in FIGS. 1 and 3. However, the graphical display of FIG. 4 may be outputted using other devices. A client application supporting communications sessions is typically web-based contained within an internet browser session. The application exposes a number of features to the user through the GUI. These graphically displayed features include a video display 1654 of one or more individuals in the session. A chat feature 1653 may be provided, including a chat history and a field 1655 where a user can input text to the chat conversation. The GUI 165 is also configured to display graphical images 1667 that are associated with individuals or clients in the session. Graphical images 1667 may include images of individuals currently participating in the communications session. An exit button 1669 is provided as an example of a way in which the user may terminate the communications session if desired.

Figure 5:
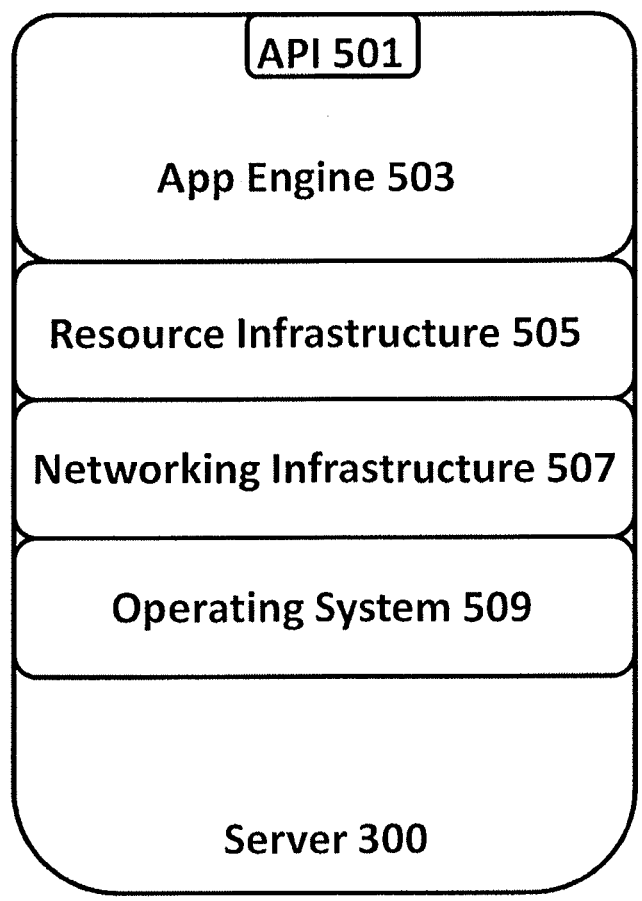
FIG. 5 is a block diagram of an application at the server of FIG. 1 that supports the multimedia communication environment and interaction among the client devices.

Referring to FIG. 5, in one example embodiment, an application programming interface (API) 501 of an Application Engine or App Engine 503 provides many resources and/or client devices to the communications session 340 (e.g., a Google+ Hangout). As an alternative, the service provider may direct the connection of such resources and/or client devices to the communications session 340. In turn, the App engine 503 may utilize resources provided from an API exposed by a resources infrastructure layer 505 and a networking layer 507, which are supported by the server 300 and its operating system 509. The App Engine 503 and the resource infrastructure layer 505 connect HTTP requests from the user to the communications sessions 340. The App engine 503 also provides a runtime environment for the communications sessions 340. Administrative support for the communications sessions 340 may be provided by the service provider in the App engine 503. The App engine 503 also provides access to a database in the resource infrastructure layer 505 for persistent storage requirements of the communications sessions 340.

Through its API 501, the App engine 503 provides the communications sessions 340 access to resources on the Internet, such as web services or other data. The App engine 503 retrieves web resources using the resource infrastructure layer 505. The communications session 340 also sends and receives messages using the App engine 503 and the resource infrastructure layer 505. The App engine 503 and the resource infrastructure layer 505 also supports a cache, which is useful for temporary data or data copied from the datastore to the cache for high speed access. The resource infrastructure layer 505 also supports a file system and scheduling resources. An example of the App Engine is Google's App Engine. An example of the resource infrastructure layer 505, the networking infrastructure 507 and the operating system 509 is Google's supporting infrastructure and operating system for its App engine.

Figure 6:
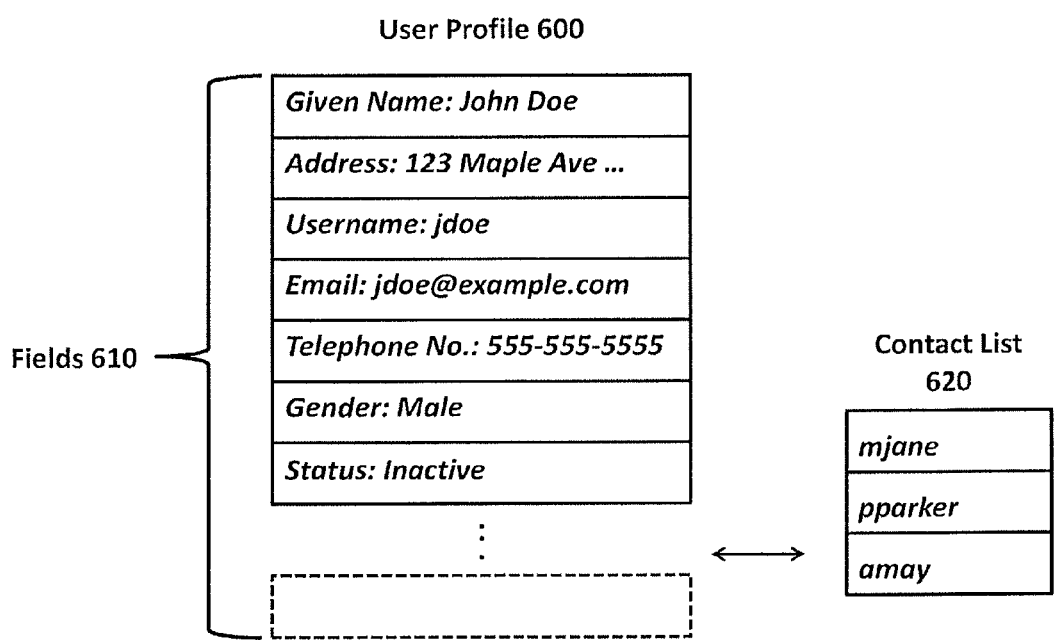
FIG. 6 is an example user profile that is created at a service provider.

Turning now to FIG. 6, one example of a user profile 600 maintained by a service provider and associated with an individual who is authorized to use the services provided by the service provider, such as participating in the multimedia communications environment described in accordance with FIGS. 1-5, is described. The user profile 600 of FIG. 6 has multiple fields 610 including, but not limited to, given name, address, username (e.g., "screen name"), email address, telephone number, gender, status, etc. In some embodiments, the user profile includes a JID, URI, or URL that may be used, e.g., by the service provider, to identify and/or locate the profile.

A user profile 600 may be created by an individual using the client device 100 that is described in accordance with FIGS. 1-4. For example, a user of the client device 100 interacts with the input device 180 and/or the GUI 165 to cause the communications client 140 to initiate contact with a service provider and request service. In this example, if the service provider does not have a record of the user, i.e., the user does not have a profile, the service provider prompts the user via GUI 165 to create a new user profile. In response, the user enters required information to create a user profile using the input device 180 and/or the GUI 165 of the client device 100 and the service provider generates a new user profile.

Once a user profile has been created, such as the user profile of "John Doe" illustrated by FIG. 6, the user has access to various services provided by the service provider. For example, user John Doe is authorized to participate in communications sessions such as the session described in accordance with FIG. 4. In some instances the service provider requires the user to download applications specific to the service that the user desires to participate in (such as an email client, an instant messaging client, a text messaging client, etc.). In other instances, the service provider hosts one or more applications at server 300 and the user is not required to download additional applications to the client device 100.

Contact information is associated with, linked to, and/or included in the user profile 600. Contact information is any address, destination, or other identifying information that allows one user or machine to communicate with another user or machine through the service provider. Examples of contact information includes, but are not limited to, email addresses, usernames, telephone numbers, and the like. In some instances, contact information is automatically created by the service provider based on the information provided by an individual to create a user profile. Alternatively, individuals may choose to customize the contact information associated with their profiles.

Additionally, mechanisms are provided by the service provider or by application(s) 120 executing on the client device 100 to maintain a list of the contact information associated with individuals that the user frequently communicates with. Such a list is commonly referred to as a contact or buddy list ("contact list"). In some embodiments, at least one contact list, e.g., contact list 620 in FIG. 6, is associated with each user profile, e.g., user profile 600 in FIG. 6, maintained by the service provider. Standard communications protocols, such as the Extensible Messaging and Presence Protocol (XMPP), may be used to build and maintain contact lists.

In some instances, the contact information in the contact list 620 associated with the user profile 600 is separated, grouped, or organized based on the preferences of the user. For example, colleagues, friends, and family members may be organized into logical groups or "circles." Additionally, the user may set various permissions for each circle. In some instances, the permissions allow certain groups or circles to view personal information about the user, e.g., the personal information contained in user profile 600, while blocking other circles from viewing such information.

Figure 7:
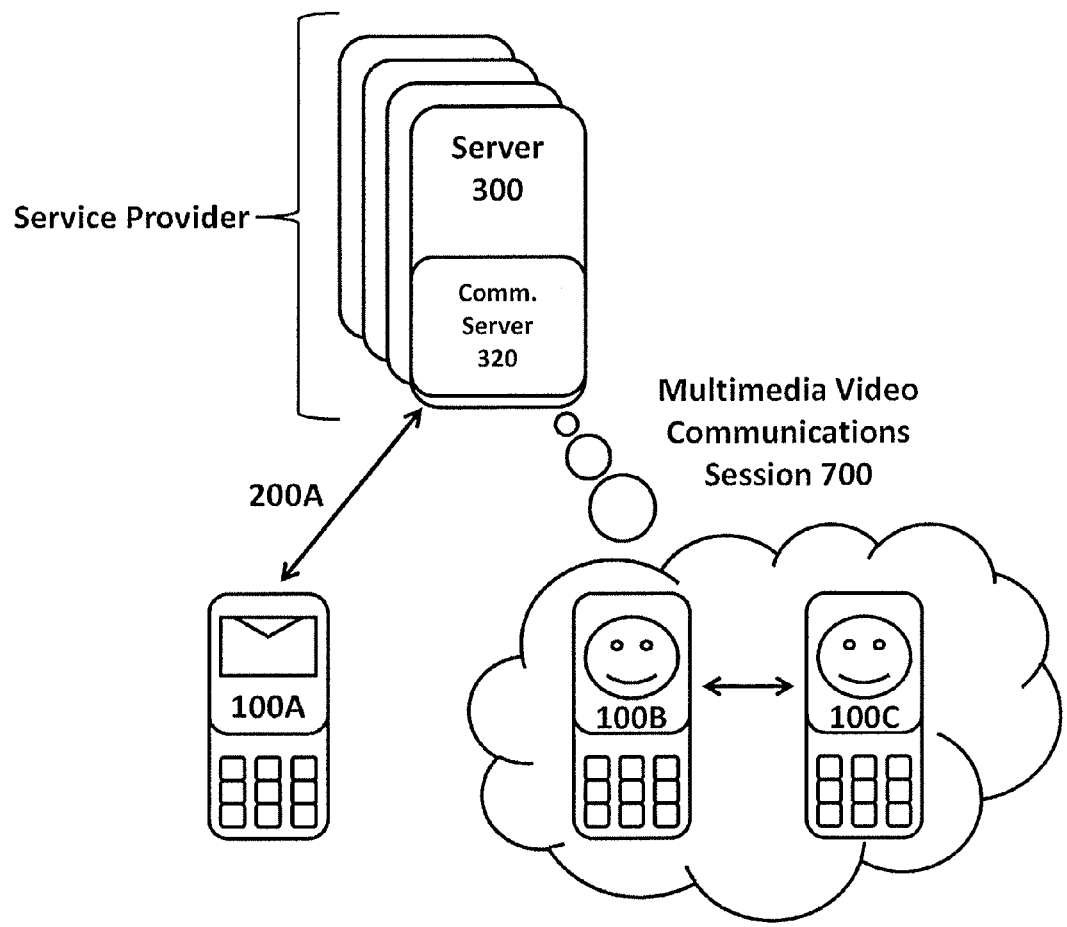
FIG. 7 is a block diagram of an example system that supports automatically suggesting or inviting a user of a client device to join an existing multimedia video communications session.

FIG. 7 depicts an example system for notifying a user that a party the user is attempting to communicate with is participating in an existing communications session and automatically suggesting or inviting the user to join the existing communications session without interrupting the communications session. The client devices 100B and 100C (FIG. 1) are engaged in the multimedia video communications session 700. In some instances, the video communications session 700 is a Google+ Hangout. Either of the client devices 100B or 100C may have established video communications session 700 by initiating the session and inviting one or more other users to participate. A user may invite one or more circles on their contact list, individual contacts, and/ or the public at large. By inviting one or more other users to participate, the party initiating the video communications session 700 or the service provider publishes an access list that is maintained at the server 300. The access list indicates the users of the multimedia communications environment that are authorized to participate in the video communications session 700. In some instances, the access list includes JIDs that identify user profiles associated with individuals that are authorized to participate in the communications session.

In this embodiment, the user of the client device 100A attempts to contact the user of the client device 100B through the service provider via email while the user of the client device 100B is participating in the video communications session 700. In some embodiments, the application(s) 120 and/or the communications client 140 residing on the client device 100A include an email client. The user of the client device 100A executes the email client and begins to input the destination of the email, i.e., an email address associated with the user of the client device 100B.

As soon as or shortly after the user of the client device 100A expresses intent to email the user of the client device 100B, the system of FIG. 7 attempts to determine the status of the recipient of the email. In some instances, the status of a user is indicated by presence information associated with standard communications protocols, e.g., XMPP. Expressing intent to contact an individual includes, but is not limited to, entering contact information associated with the individual into a destination field. In the case of an email client, this includes entering an email address associated with the desired recipient into an address field of the email. Of course, the example described in FIG. 7 is not limited to email and may be extended to any conceivable mechanism for communicating in the multimedia communications environment, such as text messaging, instant messaging, placing a telephone call, placing a video call, and the like.

In the example embodiment of FIG. 7, once the user of the client device 100A has expressed intent to contact the desired recipient, a series of decisions are made by the service provider to determine if the user of the client device 100A is authorized to join the video communications session 700. When the user of the client device 100A is authorized to join, the service provider invites to the user to join the video communications session 700 without interrupting its participants. In some instances, the suggestion to join appears as a prompt or message that is displayed by the output device 160 and/or the GUI 165 of the client device 100A. In some situations, the prompt or message may interrupt operation of the client device 100A to ensure that the user is made aware of the suggestion. Additionally, the suggestion may include a link to the video communications session 700. However communicated to the user, in response to the user accepting the suggestion, the client device 100A is joined to video communications session 700.

In some embodiments, the suggestion to join must be transmitted by the service provider and/or received by the client device 100A within a predetermined amount of time from the expression of intent to contact the desired recipient. This is to ensure that the user of the client device 100 is prompted shortly after the user expresses intent to contact the desired recipient. These embodiments may include a timer, clock, or any other device to calculate the passage of time.

Figure 8:
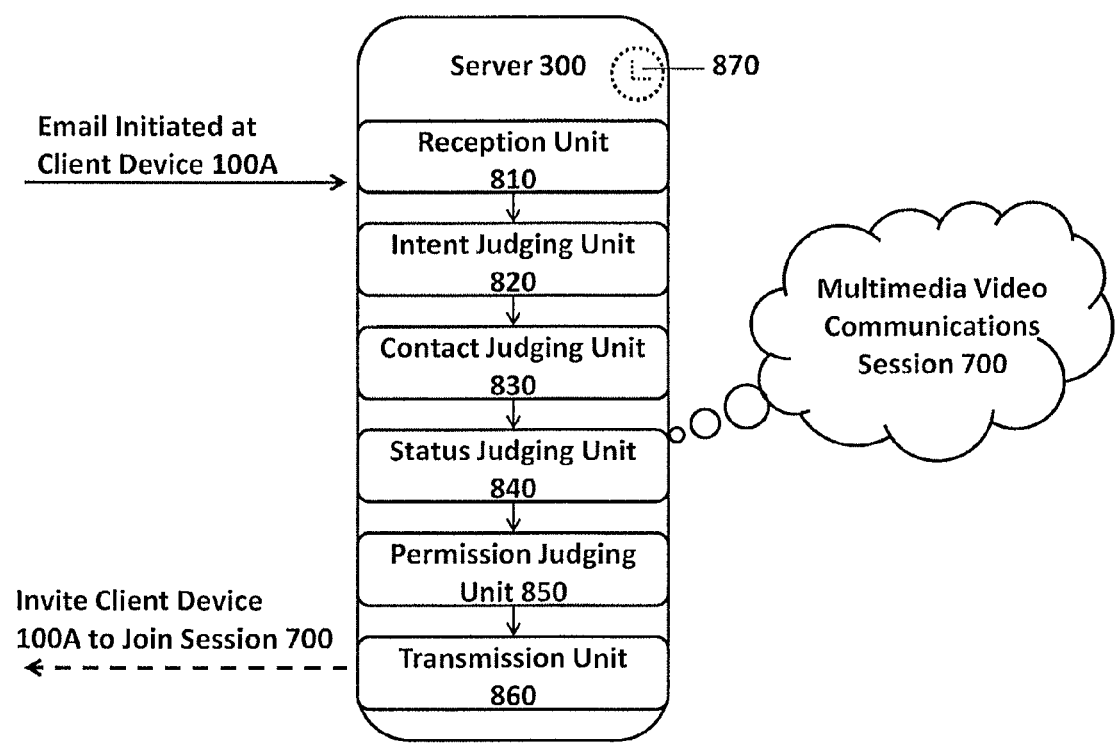
FIG. 8 is a block diagram of basic functional components for a server in FIG. 7.

FIG. 8 illustrates one example of a server 300 that is maintained by the service provider of FIG. 7. The server 300 of FIG. 8 includes reception unit 810, intent judging unit 820, contact judging unit 830, status judging unit 840, permission judging unit 850, transmission unit 860, and (optionally) time measuring unit 870. The units 810-870 of the server 300 may be implemented in a single programmed logic circuit residing at a single physical location or separate programmed logic circuits residing at one or more physical locations. Alternatively, the units 810-870 may be implemented as one or more modules residing on non-transitory computer readable media. In some instances, the server 300 of FIG. 8 additionally includes all of the functionality previously described in accordance with the server 300 of FIGS. 1-7.

In this embodiment, the reception unit 810 receives electronic communications from client devices, e.g., via channels 200A-C described in previous embodiments. The intent judging unit 820 detects or is notified when the user of a client device initiates a new communication, such as composing a new email. Once activated, the intent judging unit 820 monitors the new communication to detect the input of contact information. As soon as enough contact information to decipher the intended recipient of the new communication is input, the intent judging unit 820 captures the contact information and passes it to the contact judging unit 830.

The contact judging unit 830 determines whether the contact information is associated with one of the plurality of user profiles maintained by the service provider. In some instances, cooperation among multiple service providers allows the contact judging unit 830 to determine whether the contact information is associated with a user profile maintained by any or all of the cooperating service providers. In the scenario where the contact information is not associated with a user profile, the system does not perform the automatic suggesting or inviting and the user may complete and send the new communication without interruption.

Alternatively, the contact information may be associated with a user profile, whereby the status judging unit 840 determines the status or presence state of the user associated with the contact information, i.e., the ability and willingness of the user to engage in communications. In the example embodiment depicted by FIG. 7, the status judging unit 840 determines that the user of the client device 100B is currently participating in the video communications session 700. In some instances, the status judging unit 840 determines that the intended recipient is available for communications (i.e., not actively participating in an existing communications session), whereby the system does not perform the automatic suggesting or inviting. In other instances, the status judging unit 840 determines that the intended recipient is currently participating in an existing communications session. In this situation, the status judging unit 840 passes the identifier of the particular communications session that the intended recipient of the new communication is participating in to the permission judging unit 850. Referring, again, to the embodiment described in FIG. 7, the permission judging unit 850 passes the identifier of video communications session 700 to the permission judging unit 850.

The permission judging unit 850 determines whether the party initiating the new communication has permission to participate in the particular communications session. In this embodiment, this determination is accomplished by locating the particular communications session using its identifier and consulting the session's access list. In the example embodiment depicted by FIG. 7, the permission judging unit 850 receives the identifier of the video communications session 700 and consults its access list. If the access list indicates that the user of the client device 100A is not authorized to join, the system does not perform the automatic suggesting or inviting. Alternatively, if the access list indicates that the user of the client device 100A is authorized to join, the transmission unit 860 outputs a suggestion to the client device 100A for its user to join the video communications session 700.

The server 300 of FIG. 8 may optionally include time measuring unit 870. Time measuring unit 870 determines whether a predetermined amount of time has elapsed from the expression of intent to contact the desired recipient. In the embodiments including the time measuring unit 870, when the predetermined amount of time has elapsed the system does not perform the automatic suggesting or inviting. The predetermined amount of time may be, for example, any amount of time between 1 and 100 milliseconds. Some embodiments support a longer duration of time; other embodiments support a shorter duration of time.

While the units 810-870 of FIG. 8 are depicted as residing within the server 300 at the service provider, the system is not limited to this arrangement. In some embodiments, some or all of units 810-870 reside at the client device, e.g., the client device 100. In these embodiments, the server 300 periodically push notifications to the client device 100 indicating, among other things, the presence state information of contacts on the contact list of the user of the client device 100 and information indicating existing communications sessions (if any) that the user is authorized to participate in. Additionally, a contact list may reside locally on the client device 100. In these embodiments, the contact judging unit 830 (residing on the client device 100) makes its determination using the local contact list. The permission judging unit 850 makes its determination based on the latest push notifications sent from the server 300. As such, in the example embodiments where units 810-870 reside on the client device 100, automatic suggestions may be generated and delivered to the user of the client device 100 faster compared to other embodiments.

Figure 9:
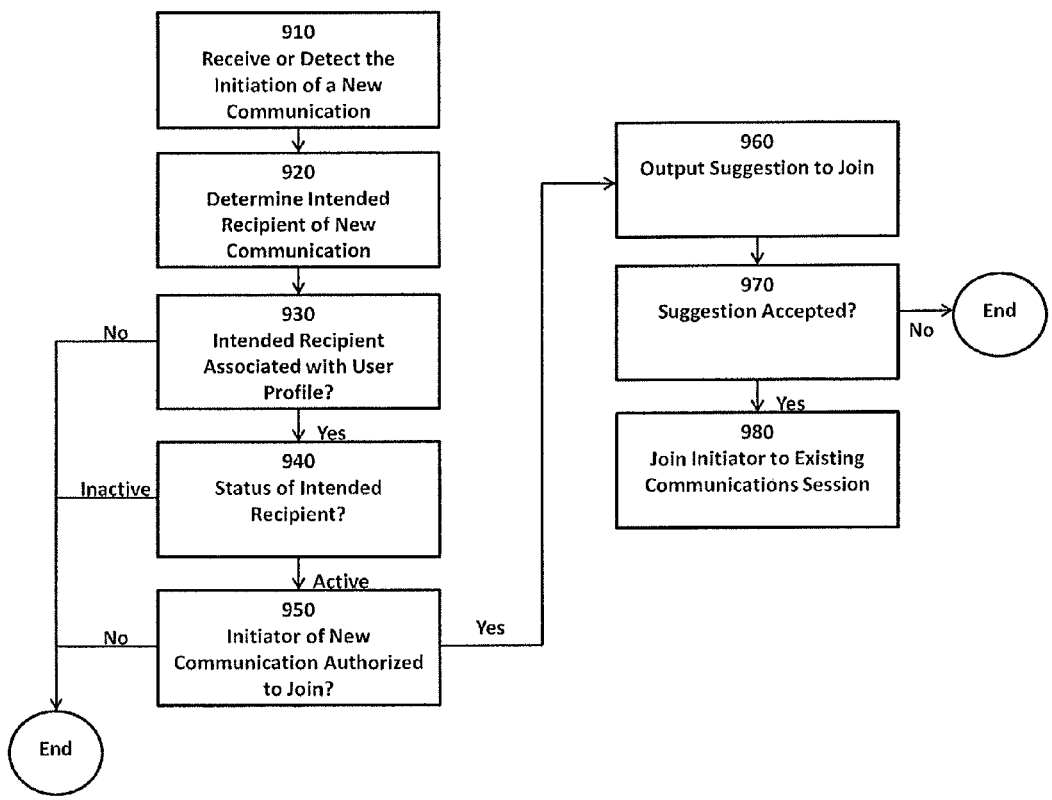
FIG. 9 is flow diagram illustrating an example method for notifying an individual that the party the individual is attempting to contact is participating in an existing communications session and automatically suggesting or inviting the individual to join the existing communications session without interrupting the communications session.

FIG. 9 describes an example method for notifying an individual that the party the individual is attempting to contact is participating in an existing communications session and automatically suggesting or inviting the individual to join the existing communications session without interrupting the communications session in accordance with FIGS. 7 and 8.

Step 910: The intent judging unit 820 detects or is notified when the user of a client device initiates a new communication. Examples of a new communication include, but are not limited to, composing a new email message, opening an instant messaging window, dialing a telephone number, and the like.

Step 920: Once activated, the intent judging unit 820 monitors the new communication and detects the input of contact information, e.g., the address or destination of the intended recipient. As soon as enough contact information to decipher the intended recipient of the new communication is input, the intent judging unit 820 captures the contact information and passes it to the contact judging unit 830.

Step 930: The contact judging unit 830 determines whether the contact information is associated with one of the plurality of user profiles maintained by the service provider. If the contact information is not associated with a user profile, the system does not perform the automatic suggesting or inviting (i.e., the method terminates) and the user may complete and send the new communication without interruption.

Step 940: If the contact judging unit 830 determined that the contact information is associated with a user profile, the status judging unit 840 determines the status or presence state of the user associated with the contact information, i.e., the ability and willingness of the user to engage in communications. Example presence states include, but are not limited to, active, inactive, online, offline, busy, participating in communications session session ID (where session ID is the JID or other identifier of the particular communications session), etc. If the status judging unit 840 determines that the intended recipient is available for communications (i.e., not actively participating in an existing communications session), the system does not perform the automatic suggesting or inviting. If the status judging unit 840 determines that the intended recipient is currently participating in an existing communications session, the status judging unit 840 passes the identifier of the particular communications session that the intended recipient of the new communication is participating in to the permission judging unit 850.

Step 950: The permission judging unit 850 determines whether the party initiating the new communication has permission to participate in the particular communications session by locating the particular communications session using its identifier and consulting the session's access list. If the access list indicates that the party initiating the new communication is not authorized to join, the system does not perform the automatic suggesting or inviting.

Step 960: If the access list indicates that the party initiating the new communication is authorized to join, the transmission unit 860 outputs a suggestion that the party joins the particular communications session.

Step 970: If the party initiating the new communication accepts the suggestion to join, that party is joined at step 980, otherwise the method terminates and new communication may be completed and sent without further interruption.

Step 980: The party initiating the new communication is joined to and may participate in the existing communications session. Throughout the process described by steps 910-980 the communications session was not interrupted.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the embodiments and does not pose a limitation on the scope of the invention unless otherwise claimed. No language in the specification should be construed as indicating any non-claimed element as essential to the practice of the invention.

Embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system comprising:
   a plurality of participating client devices participating in a multimedia video communications session;
   a non-participating client device configured to participate in multimedia video communications;
   an intent judging unit configured to determine when a user of the non-participating client device expresses intent to communicate by inputting contact information into the non-participating client device;
   a contact judging unit configured to determine whether the contact information is associated with one of a plurality of user profiles;
   a status judging unit configured to determine whether a user profile is associated with the multimedia video communications session;
   a permission judging unit configured to determine whether the user of the non-participating client device has permission to participate in the multimedia video communications session; and
   a suggestion transmission unit configured to transmit a suggestion to the non-participating client device for the non-participating client device to join the multimedia video communications session.

2. The system of claim 1, further comprising a server configured to store the plurality of user profiles, each user profile comprising at least one identifier associated with the user profile.

3. The system of claim 2, wherein the intent judging unit, the contact judging unit, the status judging unit, the permission judging unit, and the suggestion transmission unit are located at the server.

4. The system of claim 1, wherein the multimedia video communications session is a video conference comprising audio and video communications.

5. The system of claim 1, wherein the contact information includes one of an email address, a username, and a telephone number.

6. The system of claim 1, wherein the non-participating client device further comprises a communications client configured to accept input of the contact information, and
   the intent judging unit monitors the communications client and determines whether the user of the non-participating client device expresses intent to communicate before input of the contact information is complete.

7. The system of claim 1, wherein the intent judging unit, the contact judging unit, the status judging unit, the permission judging unit, and the suggestion transmission unit are located at the non-participating client device.

8. The system of claim 7, further comprising:
   a server configured to periodically push notifications to the non-participating client device indicating presence state information of contacts on a contact list.

9. The system of claim 1, wherein the non-participating client device further comprises:
   an input unit configured to receive input; and
   a display device, wherein a prompt is displayed on the display device when the suggestion transmission unit transmits a suggestion to the non-participating client device for the non-participating client device to join the multimedia video communications session.

10. The system of claim 1, further comprising an access list is associated with the multimedia video communications session, wherein the permission judging unit consults the access list to determine whether the user of the non-participating client device has permission to participate in the multimedia video communications session.

11. A method at a client comprising a processor for providing a suggestion to join an existing multimedia video communications session, the method comprising:
- detecting input of contact information into the client;
- determining whether the contact information is associated with a contact stored on a contact list that is accessible by the client;
- determining whether the contact is participating in an existing multimedia video communications session;
- determining whether the client is authorized to participate in the existing multimedia video communications session when the contact is associated with participating in the existing multimedia video communications session; and
- providing a suggestion to the client for the client to join the existing multimedia video communications session when the client is authorized to participate and when a predetermined amount of time from detecting the input of contact information has not elapsed.

12. The method of claim 11, further comprising:
- receiving periodic notifications indicating presence state information of contacts associated with the contact list accessible by the client, wherein the contact list is stored locally on the client.

13. The method of claim 12, wherein determining whether the contact is participating in the existing multimedia video communications session comprises:
- determining whether the contact is currently participating in the multimedia video communications session based on the presence state information.

14. The method of claim 11, wherein determining whether the client is authorized to participate in the existing multimedia video communications session comprises:
- determining whether an access list associated with the multimedia video communications session indicates that the client is authorized to participate.

15. The method of claim 11, wherein providing the suggestion to the client for the client to join the existing multimedia video communications session comprises:
- temporarily interrupting operation of the client and displaying a prompt presenting the suggestion.

16. A method at a server for providing a suggestion to join an existing multimedia video communications session, the method comprising:
- receiving contact information;
- determining whether the contact information is associated with a contact stored on a contact list that is accessible by the server;
- determining whether the contact is participating in an existing multimedia video communications session;
- determining whether a client is authorized to participate in the existing multimedia video communications session when the contact is participating in the existing multimedia video communications session; and
- transmitting a suggestion to the client for the client to join the existing multimedia video communications session when the client is authorized to participate and when a predetermined amount of time from receiving the contact information has not elapsed.

17. The method of claim 16, wherein determining whether the contact is participating in the existing multimedia video communications session comprises:
- determining whether the contact is currently participating in the existing multimedia video communications session based on presence state information of the contact.

18. The method of claim 16, wherein determining whether the client is authorized to participate in the existing multimedia video communications session comprises:
- determining whether an access list associated with the existing multimedia video communications session indicates that the client is authorized to participate.

19. The method of claim 16, wherein the contact information includes one of an email address, a username, and a telephone number.

* * * * *

UNITED STATES PATENT AND TRADEMARK OFFICE
CERTIFICATE OF CORRECTION

PATENT NO. : 8,477,176 B1
APPLICATION NO. : 13/553139
DATED : July 2, 2013
INVENTOR(S) : Cortes et al.

It is certified that error appears in the above-identified patent and that said Letters Patent is hereby corrected as shown below:

In the Claims

In column 15, line 12, delete "associated with".

Signed and Sealed this
Twentieth Day of August, 2013

Teresa Stanek Rea
*Acting Director of the United States Patent and Trademark Office*